Figure 3:
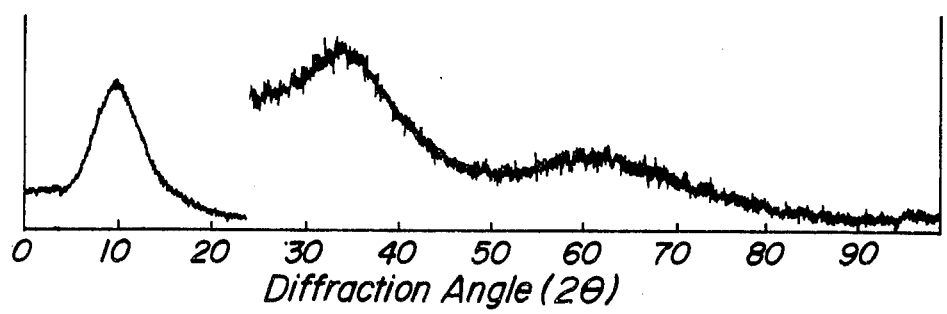

United States Patent [19]

Yajima et al.

[11] 4,052,430

[45] Oct. 4, 1977

[54] METHOD FOR PRODUCING ORGANOSILICON HIGH MOLECULAR WEIGHT COMPOUNDS HAVING SILICON AND CARBON AS MAIN SKELETON COMPONENTS AND SAID ORGANOSILICON HIGH MOLECULAR WEIGHT COMPOUNDS

[75] Inventors: Seishi Yajima; Josaburo Hayashi; Mamoru Omori, all of Oharai, Japan

[73] Assignee: The Research Institute for Iron, Steel and Other Metals of the Tohoku University, Sendai, Japan

[21] Appl. No.: 677,959

[22] Filed: Apr. 19, 1976

[30] Foreign Application Priority Data

Apr. 26, 1975 Japan .................................. 50-50223

[51] Int. Cl.$^2$ ............................................... C07F 7/08
[52] U.S. Cl. ........................ 260/448.2 D; 260/448.2 E
[58] Field of Search ................... 260/448.2 E, 448.2 D

[56] References Cited

U.S. PATENT DOCUMENTS 2,850,514 9/1958 Knoth ........................... 260/448.2 D
3,422,039 1/1969 Nametkin et al. ........... 260/448.2 D X

*Primary Examiner*—Paul F. Shaver
*Attorney, Agent, or Firm*—Ladas, Parry, Von Gehr, Goldsmith & Deschamps

[57] ABSTRACT

Organosilicon high molecular weight compounds having silicon and carbon as the main skeleton components and consisting of a mixture of linear polycarbosilanes having silicon and carbon as the main skeleton components, cyclic polycarbosilanes having silicon and carbon as the main skeleton components and polycarbosilanes in which linear carbosilane and cyclic carbosilane are chemically bonded are produced by thermally decomposing and polycondensing at least one of organosilicon compound having polysilane skeleton selected from the group consisting of cyclic polysilanes shown by the following formula $(R_1.R_2.Si)n,\ n \geqq 4$ wherein $R_1$ and $R_2$ are hydrogen, alkyl group, aryl group, silyl group, or a halogen and linear polysilane shown by the following formula

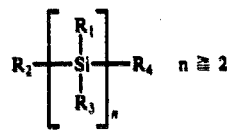

$n \geqq 2$ wherein $R_1$, $R_2$, $R_3$ and $R_4$ are hydrogen, alkyl group, aryl group, silyl group or a hologen, by heating at a temperature of 300°-2,000° C under at least one atmosphere of an inert gas and hydrogen gas or under a vacuum.

5 Claims, 5 Drawing Figures

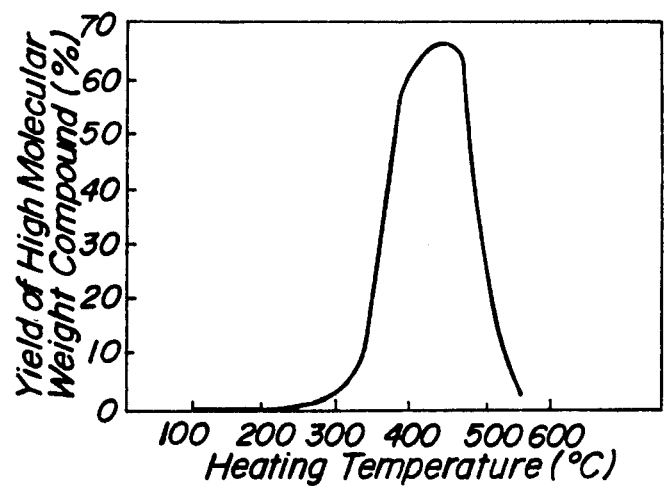
FIG_1
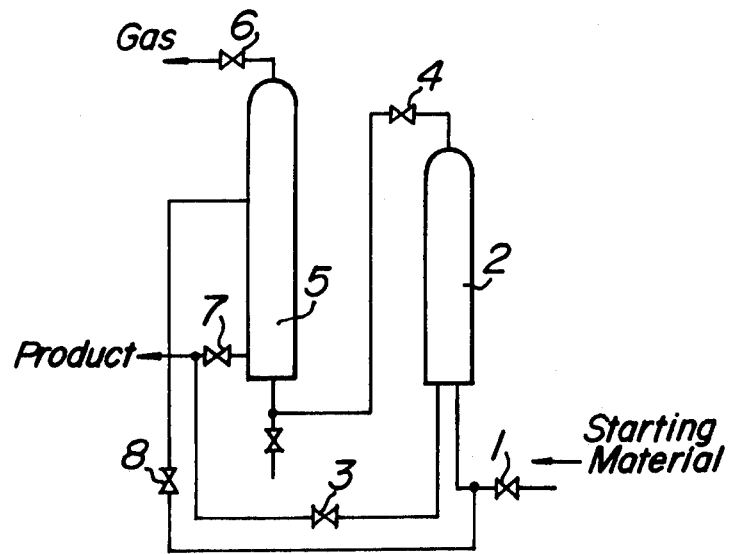
FIG_2

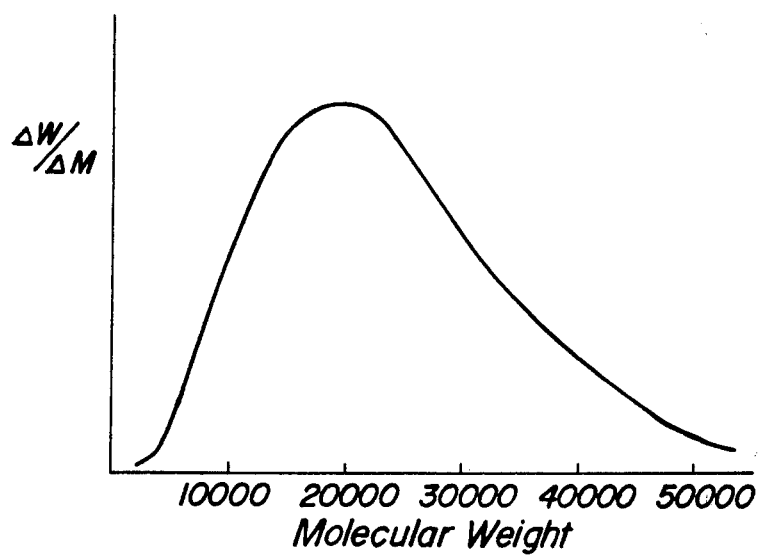
FIG_5

METHOD FOR PRODUCING ORGANOSILICON HIGH MOLECULAR WEIGHT COMPOUNDS HAVING SILICON AND CARBON AS MAIN SKELETON COMPONENTS AND SAID ORGANOSILICON HIGH MOLECULAR WEIGHT COMPOUNDS

The present invention relates to a method for producing organosilicon high molecular weight compounds having silicon and carbon as the main skeleton components from organosilicon compounds having polysilane skeleton and said organosilicon high molecular weight compounds.

Heretofore, it has never been known that the organosilicon high molecular weight compounds having silicon and carbon as the main skeleton components are produced from organosilicon compounds having polysilane skeleton.

It has been known that organosilicon polymers having silicon and carbon as the main skeleton components are produced from monosilanes through thermal decomposition but it has never been attempted to produce silicon carbide by heat treating these organosilicon polymers.

The inventors have found that the starting materials heretofore not used are selected and these materials are subjected to thermal polycondensation reaction to produce a mixture of linear polycarbosilanes having silicon and carbon as the main skeleton components, cyclic polycarbosilanes having silicon and carbon as the main skeleton components and polycarbosilanes in which linear carbosilane and cyclic carbosilane are chemically bonded.

The thus obtained polycarbosilane mixtures can be used as a starting material for production of silicon carbide fibers having a higher tensile strength than piano wire and silicon carbide moldings having a noticeably high tensile strength.

The present invention consists in a method for producing organosilicon high molecular compounds having silicon and carbide as the main skeleton components in which at least one of organosilicon compounds having polysilane skeleton are heated, if necessary by adding less than 10% of a radical initiator, under at least one atmosphere of an inert gas and hydrogen gas or under vacuum, if necessary under pressure. The present invention will be explained in more detail.

In the present invention, at least one of organo-silicon compounds having polysilane skeleton as shown hereinafter can be used as the starting material.

Cyclic polysilanes shown by the following formula:

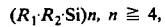

$(R_1 R_2 Si)_n$, $n \geq 4$, wherein $R_1$ and $R_2$ are hydrogen, alkyl group, aryl group, silyl group, or a halogen.

Linear polysilanes shown by the following formula:

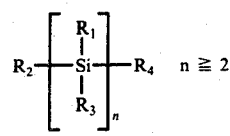

wherein $R_1$, $R_2$, $R_3$ and $R_4$ are hydrogen, alkyl group, aryl group, silyl group or a halogen.

In the cyclic polysilanes used in the present invention, $n \geq 4$, because the production of the cylic polysilanes wherein $n$ is 3, is difficult and where $R_1$ and $R_2$ are methyl group, the cylic polysilanes, wherein $n$ is 6 are easily commercially produced and when $R_1$ an $R_2$ are aryl group, the polysilanes, wherein $n$ is 5 are easily commercially produced. However, as the starting material of the present invention, the cyclic polysilanes, wherein $R_1$ and $R_2$ are respectively one of hydrogen, alkyl group, aryl group and silyl group is preferable, and a mixture of various cyclic polysilanes may be used.

In the linear polysilanes used in the present invention, $R_1$, $R_2$, $R_3$ and $R_4$ are hydrogen, alkyl group, aryl group, silyl group and a halogen and $n \geq 2$. The linear polysilanes, wherein $R_1$-$R_4$ are methyl group, are most easily produced.

Moreover, the starting material to be used in the present invention may be a mixture of the above described cyclic polysilane and linear polysilane.

In the method of the present invention, a mixture of a) linear polycarbosilanes, b) cyclic polycarbosilanes and c) polycarbosilanes, wherein linear carbosilane and cyclic carbosilane are chemically bonded, is produced.

The linear polycarbosilanes have the following molecular formula:

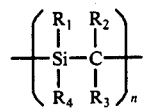

wherein $R_1$-$R_4$ have the same meanings as described above.

Several embodiments of molecular formula of the cyclic polycarbosilanes are listed hereinafter.

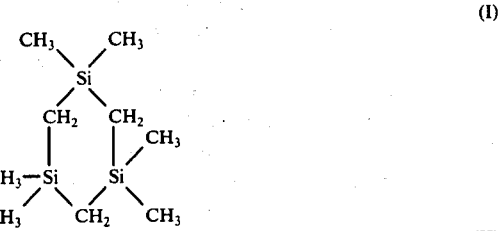
(I)

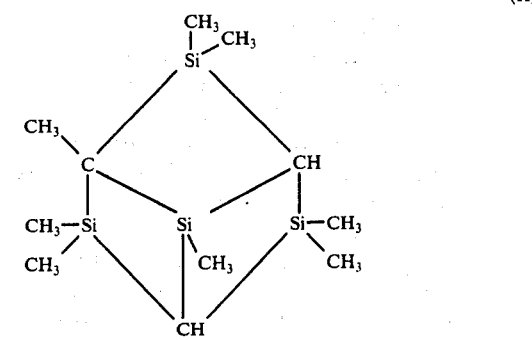
(II)

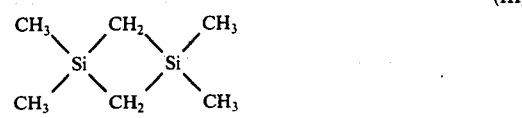
(III)

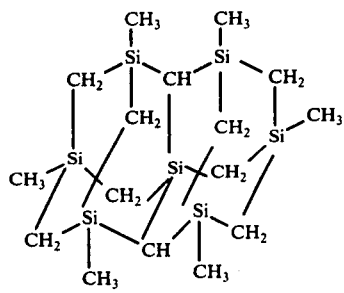

The polysilanes wherein the linear carbosilane and cyclic carbosilane are chemically bonded, are exemplified as follows.

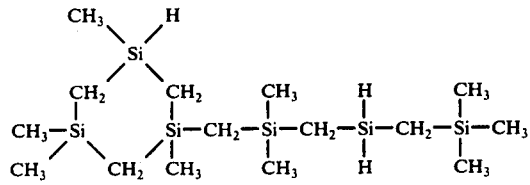

(V)

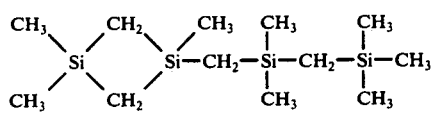

(IV)

In the present invention, if necessary, less than 10% of a radical initiator may be added to the above described starting material. As the above described radical intiator, use may be made of benzoyl perozide, ditert.-butylperoxyoxalate, ditert.-butyl peroxide, azoisobutyronitrile and the like. The present invention does not necessarily need the radical initiator but the use of the radical initiator can lower the starting reaction temperature in the heating step or increase an average molecular weight of the polycondensation product.

The reaction of the present invention does not necessarily need pressure, because a pressure is naturally applied upon the thermal polycondensation reaction but when a pressure is intensionally applied, the starting material is charged in a pressure vessil and the reaction is effected under 1–100 atmospheric pressure at a temperature of about 300°–700° C, preferably 350°–500° C.

In the linear polysilanes and cyclic polysilanes, —[Si—Si]— bond is split under the above described reaction condition and silicon free radical is generated and the reaction is started. The formed silicon free radical pulls out hydrogen from methyl group to form carbon free radical and Si atom adjacent to Si atom bonding to formed carbon free radical is transferred and between the two Si atoms, —CH₂— radical enters to form carbosilane skeleton and the remaining —[Si—Si]— bonds to successively split to form finally the above described organosilicon high molecular weigth compounds. This is explained by the following formulae:

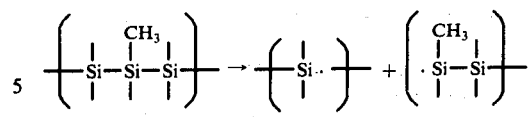
(1)

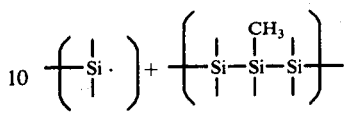
(2)

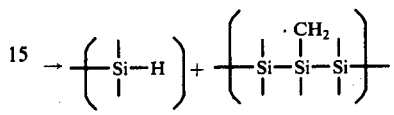
(3)

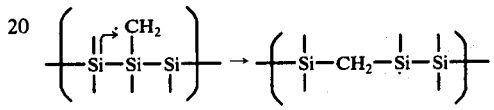

The above explanation was made with respect to the reaction mechanism of the linear polysilane but the reaction mechanism in the cyclic polysilane is the same as described above. A relation of heating temperature to the yield of the high molecular weight compounds when dodecamethylcyclohexasilane (Me₂Si)₆ is heated under argon atmosphere under about 40 atmospheric pressure for 48 hours, is shown in FIG. 1. It can be seen from FIG. 1 that the organosilicon high molecular weight compounds can be obtained in the highest yield within a temperature range of 350°–500° C. After the reaction is fully completed, when the reaction vessel is opened, the by-produced volatile compounds are volatilized. The above described volatile compounds consist of hydrogen, low molecular weight hydrocarbons and low molecular weight organosilicon compounds. The remaining reaction product not volatilized is mainly the organosilicon high molecular weight compounds having silicon and carbon as the main skeleton components.

The organosilicon high molecular weight compounds having silicon and carbon as the main skeleton components according to the present invention can be continuously produced by supplying at least one fluid of the above described cyclic and linear polysilanes together with at least one atmosphere of an inert gas and hydrogen gas into a heated reaction column to heat said polysilanes and discharging the formed high molecular weight compounds from the reaction column. In this case, the by-produced low molecular weight compounds are recycled into the reaction column to again carry out the thermal polycondensation reaction to obtain the organosilicon high molecular weight compounds according to the present invention.

An embodiment of apparatus for producing the organosilicon high molecular weight compounds is explained with reference to FIG. 2. In FIG. 2, the starting material is charged in a heated reaction column 2 through a valve 1 and heated at a temperature of 300°–2,000° C, preferably 500°–200° C and a part of the formed organosilicon high molecular weight compounds in the reaction product is discharged from the reaction column through a valve 3 and a major part of the formed organosilicon high molecular weight compounds and the low molecular weight compounds formed in the reaction column 2 are fed into a separating column 5 through a valve 4, wherein distillation is effected to separate gas from the high molecular weight compounds and the separated gas is discharged from the separating column through a valve 6 and the separated high molecular weight compounds are discharged from the separating column through a valve 7. The low molecular weight compounds separated in the column 5 are recycled into the heated reaction column 2 through a valve 8.

The molecular structure of the thus formed organosilicon high molecular weight compounds was determined by nuclear magnetic resonance absorption spectrum and ultra red absorption spectrum and it has been found that a major part of —[Si—Si]— bonds disappears and the presence of —[Si—C]— bonds is observed. In addition, the structure of the formed polycarbosilanes was determined by X-ray diffraction. As the result, as shown in FIG. 3, X-ray diffraction pattern of a fiber obtained by spinning the polycarbosilane showed that the polycarbosilane is amorphous high molecular weight compound.

Figure 4:
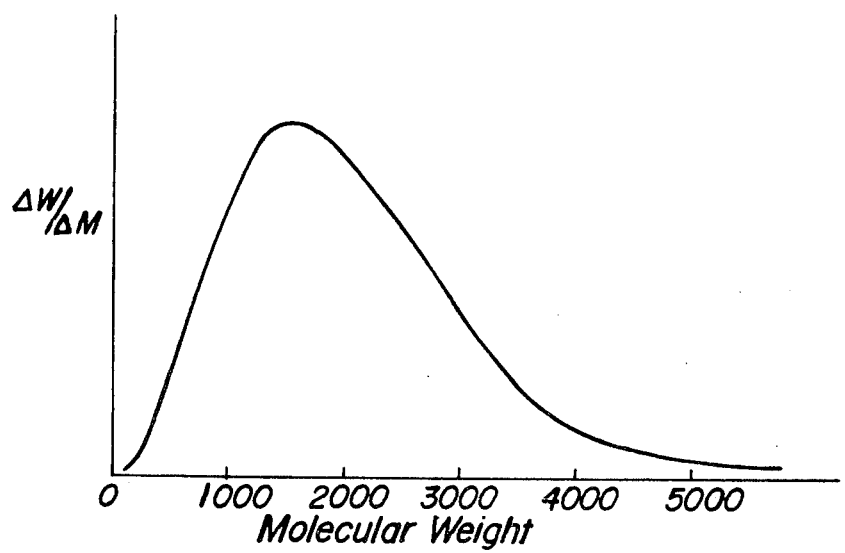

An average molecular weight of the organosilicon high molecular weigth compounds was determined by a molecular weight measuring apparatus. The average molecular weight varies depending upon the starting material, heating temperature and heating time and distributes between 300 and 50,000. For example, the molecular weight distribution of polycarbosilane obtained by heating dimethylpolysilane at 460° C for 14 hours in an autoclave and then concentrating the reaction product up to 200° C under vacuum is shown in FIG. 4, which shows that the large distribution of the molecular weight of the polycarbosilane lies between 200 and 4,000. This molecular weight distribution varies depending upon temperature and time for the production of the polycarbosilanes.

The molecular weight distrubution when the above described polycarbosilanes are produced at a temperature of 470° C for 16 hours and the concentration was effected up to 280° C under vacuum, is shown in FIG. 5. In this case, the molecular weight is broadly distributed between 2,000 and 50,000 and a yield of an inorganic product obtained by heating this molecular weight polycarbosilane reaches 75%.

The intrinsic viscosity of the organosilicon high molecular weight compounds is 0.005–1.50.

Even if an amount of the radical initiator added if necessary, in the present invention exceeds 10%, the addition effect is not particularly increased and such an addition is not economical and the most preferable amount is 0.01–1%.

When oxygen is present in the thermal polycondensation reaction, the radical polymerization reaction does not occur due to oxygen or even if said polymerization reaction occurs, the reaction stops in the course of reaction, so that the polycondensation reaction must be effected under at least one atmosphere of an inert gas and hydrogen gas or under vacuum.

The average molecular weight of the products obtained according to the method of the present invention distributes between 300 and 50,000 as described above and the low molecular weight compounds are contained. If it is intended to produce silicon carbide fiber from the polycarbosilanes, the low molecular weight compounds must be removed.

When the method of the present invention is effected under pressure or in a sealed vessel, the by-produced low molecular weight compounds are contained in the formed product but the yield of the high molecular weight compounds is improved. While, when the polycondensation reaction is effected under such a condition that the by-produced low molecular weight compounds can volatilize, an amount of the low molecular weight compounds contained in the products becomes small but the yield of the high molecular weight compounds lowers.

Then, an explanation will be made briefly, for example, with respect to the case when silicon carbide fibers are produced from the organosilicon high molecular weight compounds obtained by the method of the present invention.

The low molecular weight compounds contained in the above described organosilicon high molecular weight compounds are extracted with a solvent which can dissolve said low molecular weight compounds, the residual high molecular weight compounds are dissolved in a solvent or heated and melted to form a spinning solution, the spinning solution is spun in a conventional manner for spinning synthetic resins into filaments, the spun filaments are heated under vacuum to volatilize the remaining low molecular weight compounds and then baked at a higher temperature under vacuum or an atmosphere of an inert gas, CO gas and hydrogen gas to form silicon carbide fibers.

For a better understanding of the invention, reference is taken to the accompanying drawings, wherein FIG. 1 shows a relation of the yield of the organosilicon high molecular weight compounds to the temperature in the thermal polycondensation, when dodecamethylcyclohexasilane was used as a starting material, FIG. 2 shows an embodiment of apparatus of producing the organosilicon high molecular weight compounds, FIG. 3 shows X-ray diffraction pattern of polycarbosilane when it is spun into a filament and FIGS. 4 and 5 show the molecular weight distributions of the polycarbosilanes, respectively.

The invention is illustrated in the greater detail in the following examples which are not intended as limitations thereof.

EXAMPLE 1

10% of dodecamethylcylohexasilane [(Me$_2$Si)$_6$] was introduced into an autoclave and air in the autoclave was purged with argon gas and the thermal polycondensation was effected at 430° C for 48 hours under about 40 atmospheric pressure to obtain the organosilicon high molecular weight compounds. The resulting product was permitted to be cooled at room temperature and added with ether and the formed ether solution was taken out from the autoclave. Ether was evaporated to obtain 6.6g of a solid. An average molecular weight of the product was more than 1,500. This solid was dissolved in benzene and the resulting benzene solution was able to be spun into filaments.

EXAMPLE 2

10g of linear polydimethylsilane synthesized from dimethyldichlorosilane was charged in an autoclave and heated at 420° C for 48 hours under about 30 atmospheric pressure under argon gas to obtain the organosilicon high molecular weight compounds. The reaction product was dissolved in ether and the insoluble portion was removed and ether was evaporated from the ether solution to obtain 4.3g of a solid. An average molecular weight of this product was 5,000–15,000. This product was dissolved in benzene and the resulting solution was able to be spun in a dry process into filaments.

EXAMPLE 3

To 10g of octaphenylcylotetrasilane was added 0.1g of benzoyl peroxide and the mixture was charged in an antoclave and heated at 370° C for 24 hours under about 35 atmospheric pressure under argon gas. After the reaction was completed, the resulting product was dissolved in hexane and the solution was taken out from the autoclave and filtered and then hexane was evaporated to obtain 7.1g of a solid high molecular weight compound. An average molecular weight of this product was more than 8,000. This solid high molecular weight compound was dissolved in benzene and the solution was able to be spun in a dry process into filaments. The formed fibers were stable up to 450° C in hot treatment under argon atmosphere.

EXAMPLE 4

10g of a mixture of cyclic dimethylpolysilanes (Me$_2$Si)$_5$ and (Me$_2$Si)$_6$ and 0.5g of azoisobutyronitrile were charged in an autoclave and heated at 400° C for 12 hours under about 80 atmospheric pressure under argon gas therein. After the reaction was completed, the reaction product was dissolved in benzene and the reaulting benzene solution was discharged from the autoclave and filtered. The benzene solution was distilled under a reduced pressure to evaporate benzene, whereby 4.8g of a solid high molecular weight compound was obtained. An average molecular weight of the resulting product was 7,000–8,000, and a solution of this product in benzene was able to be spun in a dry process into filaments.

EXAMPLE 5

10g of a mixture of cyclic diphenylsilanes (Ph$_2$Si)$_4$ and (Ph$_2$Si)$_5$ and linear polydiphenylsilane was charged in an autoclave and air in the autoclave was purged with argon gas and polycondensation was effected at 380° C for 50 hours under about 60 atmospheric pressure. After the reaction was completed, benzene was added into the autoclave to dissolve the reaction product. The resulting benzene solution was taken out from the autoclave and concentrated under a reduced pressure to obtain 6.9g of a solid product. An average molecular weight of this product was 1,500–3,000. This solid product was dissolved in benzene and the benzene solution was able to be spun into filaments. The formed filaments were stable up to 450° C in heat treatment under vacuum.

EXAMPLE 6

The organosilicon high molecular weight compounds according to the present invention was produced from hexamethyldisilane under atmospheric pressure by using the apparatus as shown in FIG. 2. Hexamethyldisilane fluid was fed together with argon gas at a feeding rate of 1l/hr into a reaction column heated at 850° C. The fed hexamethyldisilane was subjected to decomposition reaction and polycondensation reaction in the heated reaction column to form high molecular weight compounds together with low molecular weight compounds. A part of the formed high molecular weight compounds was taken out from the reaction column and a major part of the high molecular weight compounds was introduced into a separating column together with the low molecular weight compounds and in said column, the gas and the low molecular weight compounds were separated from the high molecular weight compounds. The separated low molecular weight compounds were recycled into the heated reaction column. After the operation of 10 hours, 5.4Kg of the high molecular weight compounds was obtained. An average molecular weight of this product was 3,500. This product was able to be spun by heating at 68° C.

EXAMPLE 7

100g of linear polysilane was fed into a quartz reaction vessel and circulated by heating at 350° C for 5 hours and then gradually heated up to 470° C, while removing the evaporating fraction, after which cooled. The reaction product was dissolved in n-hexane and the resulting solution was taken out from the reaction vessel and filtered and then concentrated by means of an aspirator to remove n-hexane and further by means of a vacuum pump to completely remove n-hexane, whereby 43g of the high molecular weight compounds was obtained. An average molecular weight of the product was 980 and the intrinsic viscosity was 0.17. When this product was baked up to 1,300° C in a temperature raising rate of 250° C/hr under vacuum, an yield of SiC was 61%.

What is claimed is:

1. A method for producing organosilicon high molecular weight compounds having silicon and carbon as the main skeleton components and consisting of a mixture of linear polycarbosilanes having silicon and carbon as the main skeleton components, cyclic polycarbosilanes having silicon and carbon as the main skeleton components and polycarbosilanes in which linear carbosilane and cyclic carbosilane are chemically bonded, which comprises thermally decomposing and polycondensing at least one of organosilicon compounds having polysilane skeleton selected from the group consisting of cyclic polysilanes shown by the following formula

$(R_1 \cdot R_2 Si)n$, $n \geqq 4$ wherein R$_1$ and R$_2$ are hydrogen, alkyl group, aryl group, silyl group, or a halogen and linear polysilane shown by the following formula

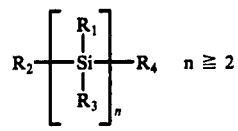

$$R_2 \!-\!\!\left[\!\begin{array}{c} R_1 \\ | \\ Si \\ | \\ R_3 \end{array}\!\right]_n\!\!-\! R_4 \quad n \geqq 2$$

wherein R$_1$, R$_2$, R$_3$ and R$_4$ are hydrogen, alkyl group, aryl group, silyl group or a hologen, by heating at a temperature of 300°–2,000° C under at least 1 atmosphere of an inert gas and hydrogen gas or under a vacuum.

2. A method as claimed in claim 1, wherein less than 10% of a radical initiator is added to the starting organosilicon compound.

3. A method as claimed in claim 2, wherein said radical initiator is benzoyl peroxide, ditert.-butylperoxyoxalate, ditert.-butylperoxide or azoisobutyronitrile.

4. A method as claim in claim 1, wherein said thermal decomposition and polycondensation reaction is effected under pressure of 1–100 atmospheric pressure at a temperature of 300°–700° C.

5. The organosilicon high molecular weight amorphous compounds consisting of a mixture of linear polycarbosilanes having silicon and carbon as the main skeleton components, cyclic polycarbosilanes having silicon and carbon as the main skeleton components and polycarbosilanes in which linear carbosilane and cyclic carbosilane are chemically bonded, which have an average molecular weight of 300–50,000 and an intrinsic viscosity of 0.005–1.50.

* * * * *